US012583123B2

(12) United States Patent　　　　(10) Patent No.: US 12,583,123 B2
Kittaka　　　　　　　　　　　　　　(45) Date of Patent:　Mar. 24, 2026

(54) ITERATIVE CONTROL OF ROBOT FOR TARGET OBJECT

(71) Applicant: KABUSHIKI KAISHA YASKAWA DENKI, Kitakyushu (JP)

(72) Inventor: Tatsuya Kittaka, Fukuoka (JP)

( * ) Notice: Subject to any disclaimer, the term of this patent is extended or adjusted under 35 U.S.C. 154(b) by 186 days.

(21) Appl. No.: 18/407,440

(22) Filed: Jan. 9, 2024

(65) Prior Publication Data

US 2024/0139962 A1　　May 2, 2024

Related U.S. Application Data

(63) Continuation of application No. PCT/JP2021/026192, filed on Jul. 12, 2021.

(51) Int. Cl.
　　*B25J 9/16*　　　(2006.01)
　　*B25J 13/08*　　(2006.01)
　　*B25J 19/02*　　(2006.01)
(52) U.S. Cl.
　　CPC ........... *B25J 9/1697* (2013.01); *B25J 9/1664* (2013.01); *B25J 9/1679* (2013.01); *B25J 13/089* (2013.01)
(58) Field of Classification Search
　　CPC ...... B25J 9/1697; B25J 9/1664; B25J 9/1679; B25J 13/089; B25J 9/1676; B25J 19/023; G05B 2219/40584
　　See application file for complete search history.

(56) References Cited

U.S. PATENT DOCUMENTS

| | | |
|---|---|---|
| 2013/0211593 A1 | 8/2013 | Domae et al. |
| 2021/0084238 A1 | 3/2021 | Kashiwagi et al. |
| 2021/0101293 A1 | 4/2021 | Kobayashi et al. |
| 2021/0224579 A1* | 7/2021 | Jones ....................... G06T 7/74 |

(Continued)

FOREIGN PATENT DOCUMENTS

| | | |
|---|---|---|
| JP | H8-030327 | 2/1996 |
| JP | 2012-225752 | 11/2012 |

(Continued)

OTHER PUBLICATIONS

International Search Report dated Sep. 21, 2021 for PCT/JP2021/026192.

(Continued)

*Primary Examiner* — Adam R Mott
*Assistant Examiner* — Heather J Keniry
(74) *Attorney, Agent, or Firm* — SHIPWAY IP

(57)　　　　ABSTRACT

A robot control system includes circuitry to iteratively move a robot toward a task area in which the robot is to perform a task on a target object, by acquiring a first image of an observation area in a vicinity of the robot from an image sensor, calculating a probability that the observation area includes the task area based on the first image, extracting the task area from the first image based on the probability, controlling the robot to cause the robot to approach the task area, acquiring a second image of the observation area from the image sensor, after the robot approaches the task area, calculating a probability that the observation area includes the task area based on the second image, extracting the task area from the second image based on the probability, and controlling the robot to further approach the task area extracted from the second image.

20 Claims, 5 Drawing Sheets

(56)  References Cited

U.S. PATENT DOCUMENTS

| 2021/0357661 A1 * | 11/2021 | Heenan | ..................... | G06T 7/97 |
| 2023/0256614 A1 * | 8/2023 | Yamakura | .............. | B25J 9/1653 |
| | | | | 700/259 |
| 2024/0112498 A1 * | 4/2024 | Miyata | ................... | G06V 20/52 |

FOREIGN PATENT DOCUMENTS

| JP | 5558585 | 7/2014 |
| JP | 2020-127102 | 8/2020 |
| JP | 6743526 | 8/2020 |
| JP | 2021-044749 | 3/2021 |
| JP | 2021-060849 | 4/2021 |
| WO | 2012/066819 | 5/2012 |

OTHER PUBLICATIONS

International Preliminary Report on Patentability with Written Opinion dated Jan. 25, 2024 for PCT/JP2021/026192.

\* cited by examiner

*Fig.3*

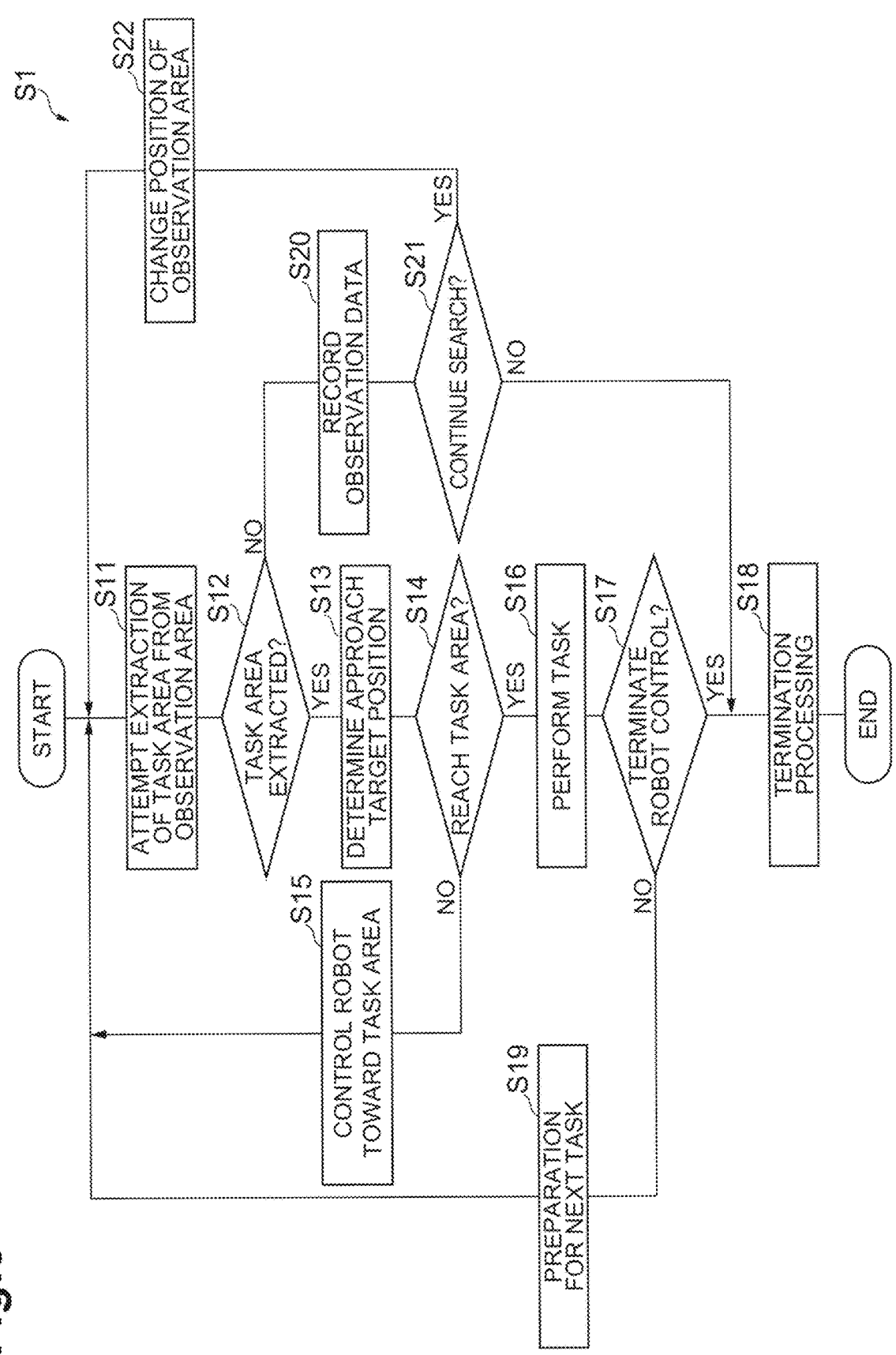

S1

START

S11 — ATTEMPT EXTRACTION OF TASK AREA FROM OBSERVATION AREA

S12 — TASK AREA EXTRACTED?

NO

S22 — CHANGE POSITION OF OBSERVATION AREA

YES

S13 — DETERMINE APPROACH TARGET POSITION

S14 — REACH TASK AREA?

NO

S15 — CONTROL ROBOT TOWARD TASK AREA

YES

S16 — PERFORM TASK

S17 — TERMINATE ROBOT CONTROL?

NO

S19 — PREPARATION FOR NEXT TASK

YES

S18 — TERMINATION PROCESSING

END

S20 — RECORD OBSERVATION DATA

S21 — CONTINUE SEARCH?

YES

NO

*Fig.4*
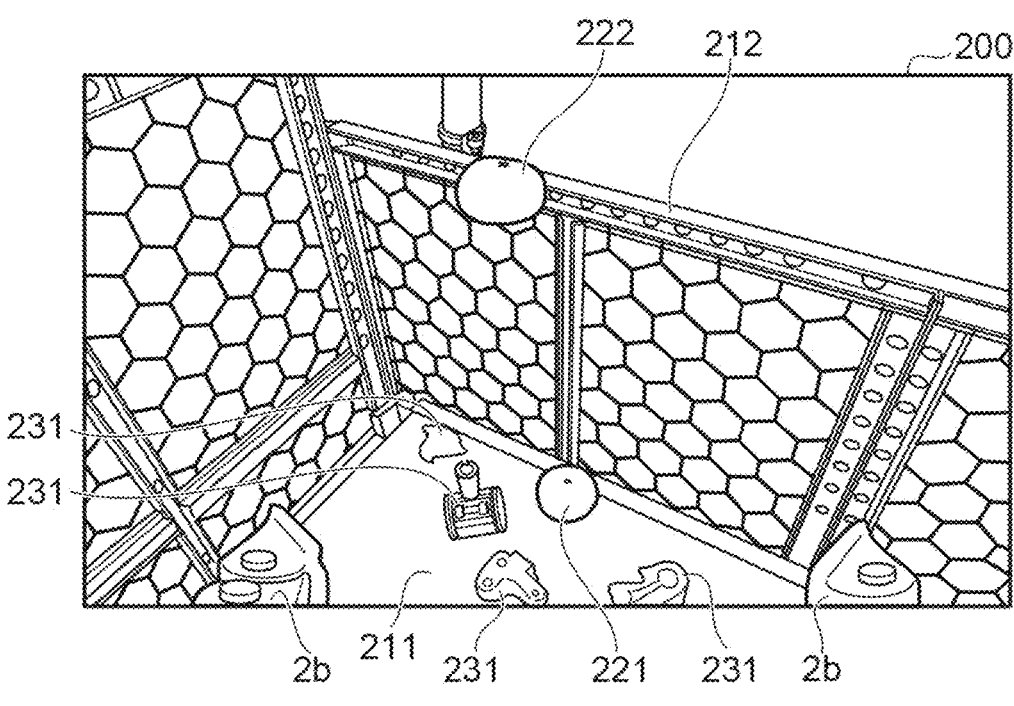
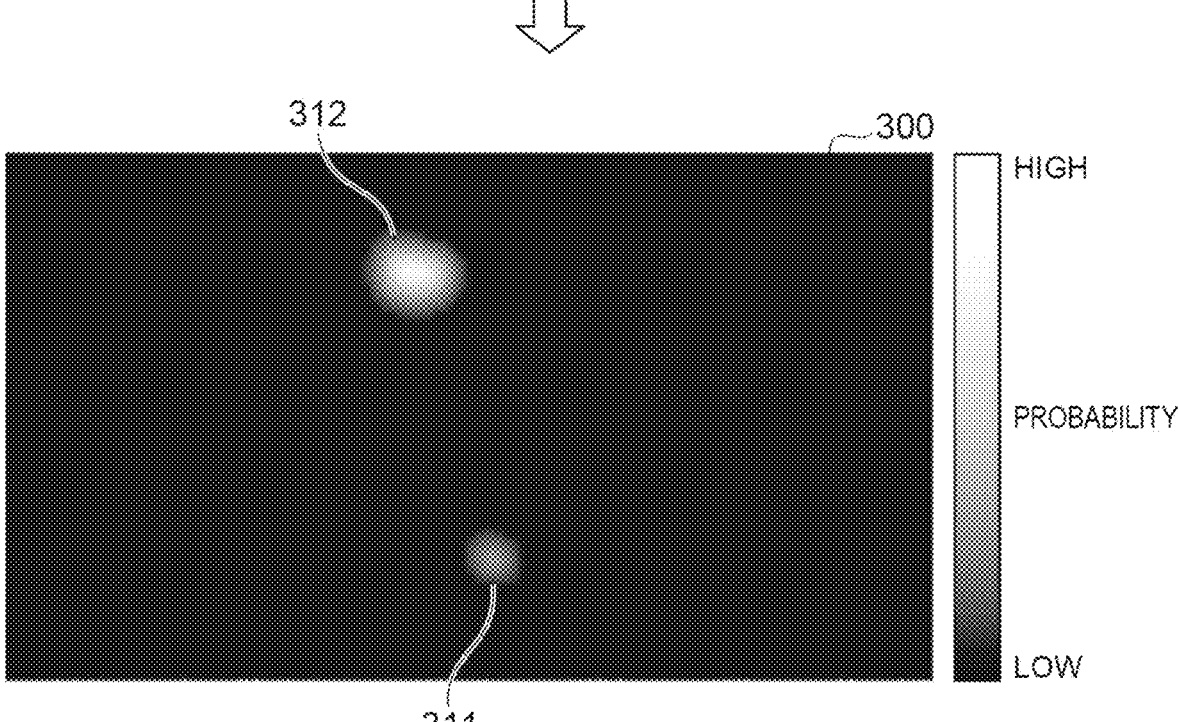

ITERATIVE CONTROL OF ROBOT FOR TARGET OBJECT

CROSS-REFERENCE TO RELATED APPLICATIONS

This application is a continuation application of PCT Application No. PCT/JP2021/026192, filed on Jul. 12, 2021. The entire contents of the above mentioned PCT application is incorporated herein by reference.

BACKGROUND

Field

An aspect of the present disclosure relates to a robot control system, a robot system, a robot control method, and a robot control program.

Description of the Related Art

Japanese Unexamined Patent Application Publication No. 1996-30327 describes an active environment recognition system that uses various sensors to recognize an external environment around the sensors. The system includes one or more sensor mechanisms for collecting information of the external environment, an actuator mechanism for changing the external environment, and a hierarchical information processing mechanism for generating an appropriate motion command to the actuator mechanism based on the sensor information from the sensor mechanism.

SUMMARY

A robot control system according to an aspect of the present disclosure includes: acquire a first image of an observation area in a vicinity of a robot, from an image sensor; calculate a probability that the observation area includes a task area in which the robot is to perform a task on a target object, based on the first image; extract the task area from the first image, based on the probability calculated; control the robot to cause the robot to approach the task area; acquire a second image of the observation area from the image sensor, after the robot approaches the task area; calculate a probability that the observation area includes the task area, based on the second image; extract the task area from the second image based on the probability associated with the second image; and control the robot to further approach the task area extracted from the second image, to iteratively move the robot toward the task area.

A processor-executable method according to an aspect of the present disclosure includes: acquiring a first image of an observation area in a vicinity of a robot, from an image sensor, calculating a probability that the observation area includes a task area in which the robot is to perform a task on a target object, based on the first image; extracting the task area from the first image, based on the probability calculated; controlling the robot to cause the robot to approach the task area; acquiring a second image of the observation area from the image sensor, after the robot approaches the task area; calculating a probability that the observation area includes the task area, based on the second image; extracting the task area from the second image based on the probability associated with the second image; and controlling the robot to further approach the task area extracted from the second image, to iteratively move the robot toward the task area.

A non-transitory computer-readable storage medium according to an aspect of the present disclosure stores processor-executable instructions to: acquire a first image of an observation area in a vicinity of a robot, from an image sensor, calculate a probability that the observation area includes a task area in which the robot is to perform a task on a target object, based on the first image; extract the task area from the first image, based on the probability calculated; control the robot to cause the robot to approach the task area; acquire a second image of the observation area from the image sensor, after the robot approaches the task area; calculate a probability that the observation area includes the task area, based on the second image; extract the task area from the second image based on the probability associated with the second image; and control the robot to further approach the task area extracted from the second image, to iteratively move the robot toward the task area.

BRIEF DESCRIPTION OF THE DRAWINGS

FIG. 3 is a flowchart showing an example of processing in the robot control system.

FIG. 4 is a diagram illustrating an example extraction of a task area.

DETAILED DESCRIPTION

In the following description, with reference to the drawings, the same reference numbers are assigned to the same components or to similar components having the same function, and overlapping description is omitted.

System Configuration

In some examples, the robot control system according to the present disclosure may be a component of a robot system 1. The robot system 1 is a mechanism for automating a predetermined task by causing a robot to perform an operation for achieving a predetermined purpose.

Figure 1:
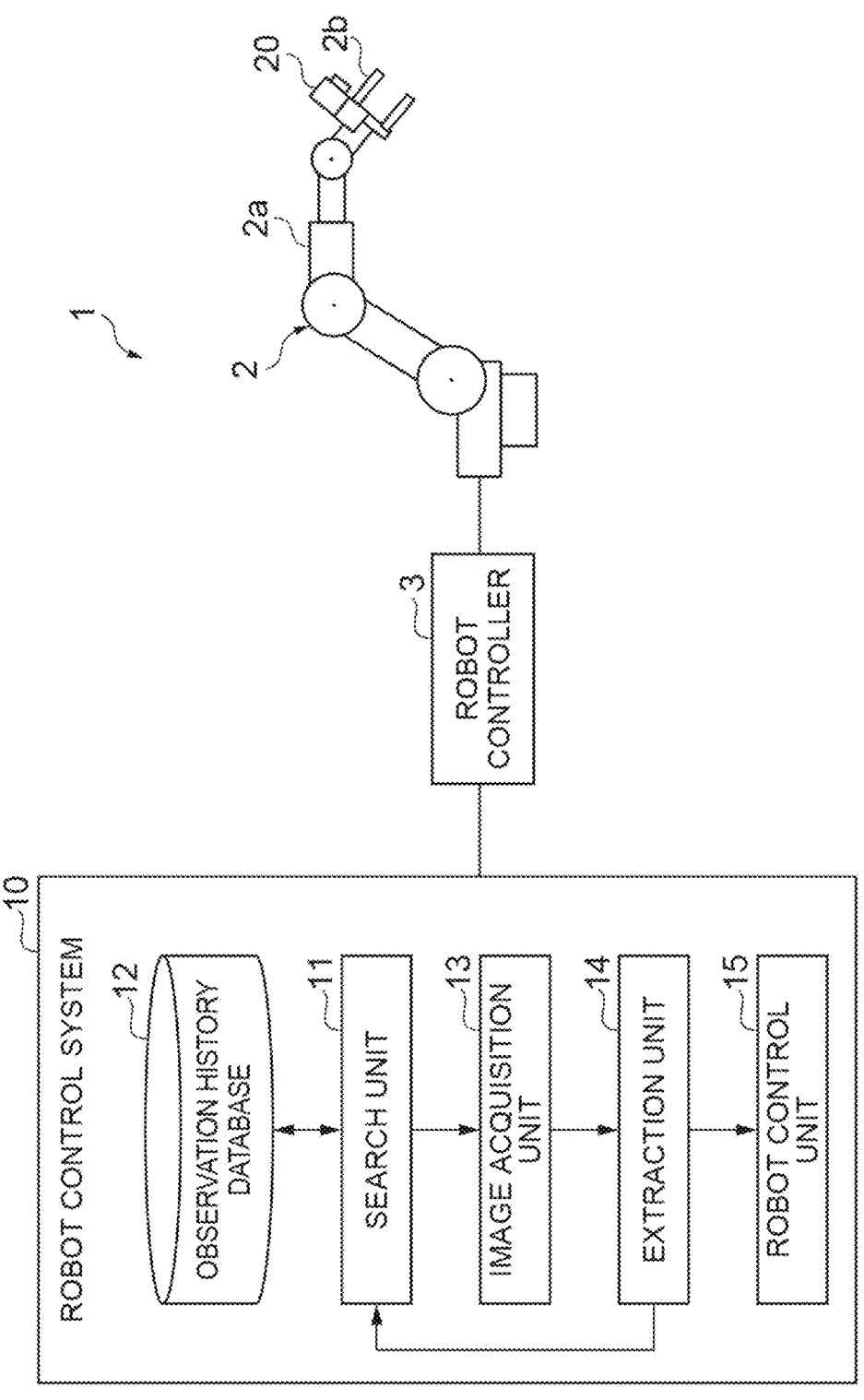
FIG. 1 is a diagram showing an example application of a robot control system.

FIG. 1 is a diagram showing an example configuration of the robot system 1 and an example application of the robot control system. In this example, the robot system 1 includes a robot control system 10, one or more robots 2, and one or more robot controllers 3 corresponding to the one or more robots 2. FIG. 1 shows one robot 2 and one robot controller 3, and shows a configuration in which one robot 2 is connected to one robot controller 3. However, the number of devices and the connection method are not limited to the example of FIG. 1. For example, one robot controller 3 may be connected to a plurality of the robots 2. A communication network connecting the devices may be a wired network or a wireless network. The communication network may include at least one of the Internet and an intranet. Alternatively, the communication network may be simply implemented by one communication cable.

The robot control system 10 is a computer system for operating the robot 2 autonomously in at least some situations. The robot control system 10 performs a predetermined calculation to generate a command signal for controlling the robot 2. In some examples, the command signal includes data for controlling the robot 2, and for example, includes a path indicating a trajectory of the robot 2. The trajectory of the robot 2 refers to a route of motion of the robot 2 or a component thereof. For example, the trajectory of the robot 2 may be a trajectory of the tip portion. The robot control system 10 transmits the generated command signal to the robot controller 3.

The robot controller 3 is a device that operates the robot 2 in accordance with the command signal from the robot control system 10. In some examples, the robot controller 3 calculates a joint angle target value (an angle target value of each joint of the robot 2) for matching the position and posture of the tip portion to a target value indicated by the command signal, and controls the robot 2 in accordance with the angle target value.

The robot 2 is a device or machine that works on behalf of a person. In some examples, the robot 2 is a multi-axis serial link type vertical articulated robot. The robot 2 includes a manipulator 2a and an end effector 2b that is a tool attached to a tip of the manipulator 2a. The robot 2 is capable of using the end effector 2b to perform various process. The robot 2 may freely change the position and posture of the end effector 2b within a predetermined range. The robot 2 may be a six-axis vertical articulated robot, or a seven-axis vertical articulated robot in which one redundant axis is added to six axes.

The robot 2 operates under the control by the robot control system 10 to perform a predetermined task. In the present disclosure, the task refers to a series of processes executed by the robot 2 in order to achieve a certain purpose. The robot 2 performs the task to assist a user of the robot system 1. For example, the task is set to process a target object. Examples of the tasks include "grasp a target object and place it on a conveyor", "grasp a component and attach it to a workpiece", and "spray a target object". In the present disclosure, the target object refers to a tangible object to be processed by the robot 2.

In a situation where a surrounding environment of the robot 2 is unknown, the robot control system 10 actively extracts, as a task area, an area (or region) in which the robot 2 is expected to be able to perform the task, that is, an area (or region) in which the target object is expected to be processed, and approaches the robot 2 toward the target object (task area). The robot control system 10 brings the robot 2 close to the target object while repeating the extraction of the task area. In a case where the robot 2 reaches the task area, the robot control system 10 causes the robot 2 to perform the task. In the present disclosure, the fact that the robot 2 reaches the task area refers to the fact that the robot 2 is sufficiently close to the target object so as to execute the task.

The robot control system 10 extracts the task area based on not only the recognition of the surrounding environment of the robot 2 but also the potential for action indicating whether the robot 2 is able to operate in that environment. That is, the robot control system 10 does not separately consider two elements of the environment recognition and the potential for action, but considers both of these elements to extract the task area. By extracting the task area in this manner, the robot 2 may be controlled more efficiently than in a case where these two elements are considered separately.

In order to recognize an unknown surrounding environment, the robot control system 10 uses the active sensing, which is a technique for actively changing the conditions of sensors to search for and collect necessary information, so as to recognize the target which the robot 2 should reach, even if the conditions relating to the target object or surrounding environment change frequently or if the prior modeling is difficult. The active sensing is a technique for finding an unknown target and is therefore different from the visual feedback that determines the position of a mechanical system towards a known target.

Considering the potential for action may be said to considering the meaning which the recognized environment gives to a motion of the robot 2. It may be therefore said that the robot control by the robot control system 10 is a mechanism using the concept of affordance. The robot control system 10 may realize the advanced decision-making regarding the robot control by combining and symbolizing the perception (sensor) and the motion of the robot. By considering the potential for action, similar tasks may be processed flexibly without using a strict model. In addition, since it is sufficient to process information directly related to the operation of the robot, the calculation for the robot control may be executed efficiently.

Examples of the sensor for recognizing a three-dimensional space in the vicinity of the robot 2 includes a vision sensor (or image sensor) such as a camera. In some examples, the robot 2 includes a camera 20 that images the vicinity of the end effector 2b. The coverage range of the camera 20 may be set to image at least a portion of the end effector 2b. The camera 20 may be arranged on the manipulator 2a, for example mounted near the tip of the manipulator 2a. The camera 20 moves in response to the motion of the robot 2. That is, the camera 20 is movable according to a movement of the robot 2. The movement may include a change in at least one of the position and posture of the camera 20. The camera 20 may be provided at a different location than the robot 2, as long as it moves in response to the motion of the robot 2. For example, the camera 20 may be attached to another robot, or may be movably mounted on a roof, wall, or camera stand.

The robot control system 10 extracts the task area from an observation area in the vicinity of the robot 2 based on information obtained from at least one predetermined sensor. In a case where the camera 20 is used, the "information obtained from the sensor" is an image (still image or video) obtained from the camera 20. In a case where the task area is able to be extracted, the robot control system 10 controls the robot 2 such that the robot 2 approaches the target object. The robot control system 10 extracts the task area again after the robot 2 approaches the target object, and further approaches the robot 2 to the target object in a case where the task area is able to be extracted. In this way, the robot control system 10 repeats the extraction of the task area and the control of bringing the robot 2 close to the target object. In a case where the robot 2 reaches the task area, the robot control system 10 causes the robot 2 to perform the task. By repeating the extraction of the task area and the approach to the target object, the target object may be processed while adapting to a change in the surrounding situation. In addition, even when the sensitivity of the sensor is not high or there is a calibration error of the sensor, the task may be performed with a high degree of accuracy via the repetitive processing.

In a case where the robot control system 10 causes the robot 2 to perform a plurality of tasks different from each other (that is, a plurality of types of tasks), the robot control system 10 extracts the task area corresponding to each type of task.

In some examples, the task includes a step in which the robot 2 contacts the target object. Examples of such tasks include a task involving grasping the target object and a task involving pushing or pulling the target object. In a case where the task is performed by the robot 2, the robot control system 10 extracts, as the task area, an area (or region) where the robot 2 is able to contact the target object to perform the task.

In the present disclosure, the observation area refers to an area (or region) that is set as a range for extracting the task area. It also may be said that the observation area is an area (or region)captured by the sensor. For example, the observation area is an area captured by the camera 20.

In a case where the task area is unable to be extracted in a certain observation area, the robot control system 10 changes the position of the observation area and attempts to extract the task area in the changed observation area. The situation that "task area is unable to be extracted in the observation area" includes a case where there is no unprocessed task area in the observation area. In some examples, the robot control system 10 repeats the extraction of the task area and the control of bringing the robot 2 close to the target object in each observation area while changing the position of the observation area in the three-dimensional space in the vicinity of the robot 2. In this way, the robot control system 10 controls the robot 2 while selectively using the exploration and exploitation. The robot 2 autonomously processes one or more target objects positioned in the vicinity of the robot 2 in accordance with that control.

FIG. 1 also shows an example functional configuration of the robot control system 10. In some examples, the robot control system 10 includes a search unit 11, an observation history database 12, an image acquisition unit 13, an extraction unit 14, and a robot control unit 15 as functional components. The search unit 11 is a functional module that sets the position of the observation area. The search unit 11 records observation data indicating the observation area in which the task area is searched. The observation history database 12 is a functional module that stores the observation data. The image acquisition unit 13 is a functional module that acquires an image of the observation area from the camera 20. The extraction unit 14 is a functional module that extracts the task area from the observation area based on the image. The robot control unit 15 is a functional module that controls the robot 2 based on the task area. In some examples, the robot control unit 15 brings the robot 2 close to the target object in response to extracting the task area, and causes the robot 2 to perform the task in response to the robot 2 reaching the task area.

The robot control system 10 may be implemented by any type of computer. The computer may be a general-purpose computer such as a personal computer or a business server, or may be incorporated into a dedicated device that executes specific processing.

Figure 2:
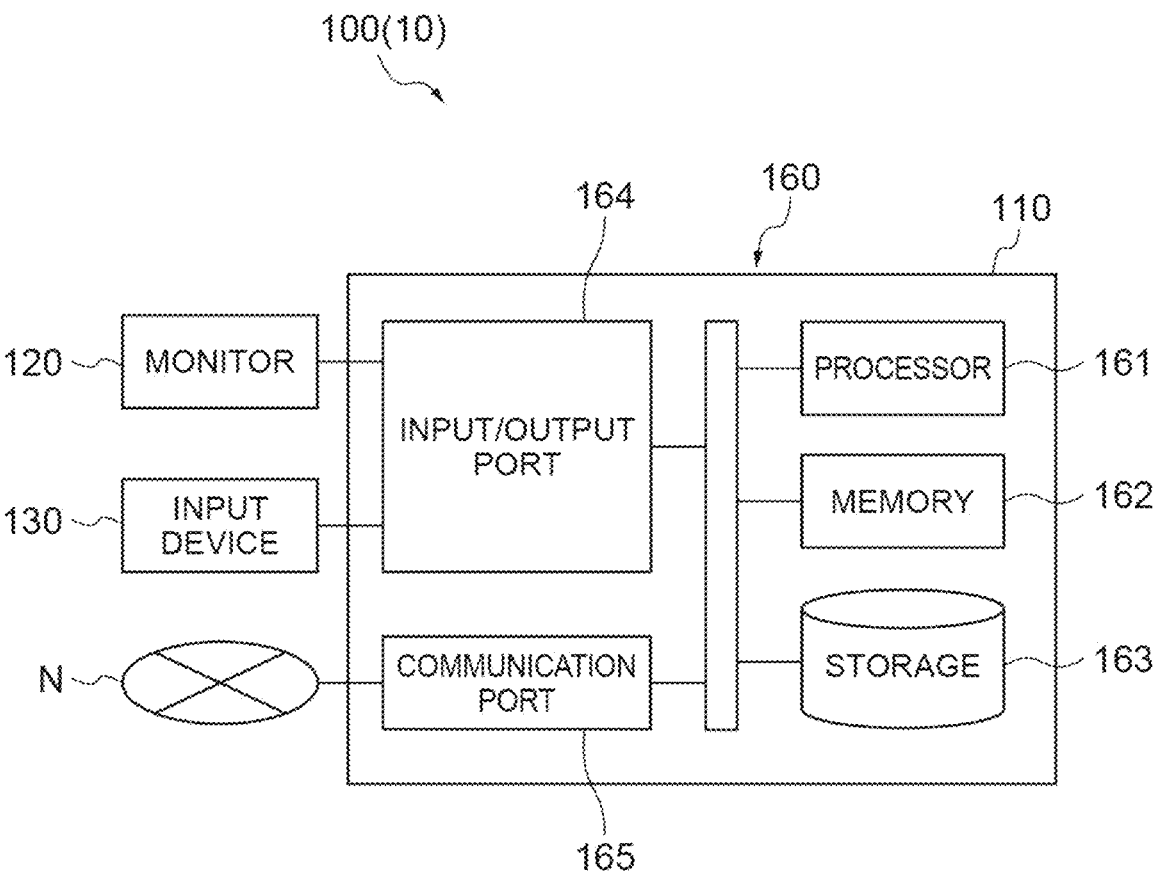
FIG. 2 is a diagram showing an example hardware configuration of a computer used for the robot control system.

FIG. 2 is a diagram illustrating an example hardware configuration of a computer 100 used for the robot control system 10. In this example, the computer 100 comprises main body 110, a monitor 120, and an input device 130.

The main body 110 is a device having circuitry 160. The circuitry 160 has at least one processor 161, a memory 162, a storage 163, an input/output port 164, and a communication port 165. The storage 163 records a program for configuring each functional module of the main body 110. The storage 163 is a computer-readable storage medium such as a hard disk, a nonvolatile semiconductor memory, a magnetic disk, or an optical disc. The memory 162 temporarily stores the program loaded from the storage 163, a calculation result of the processor 161, and the like. The processor 161 configures each functional module by executing the program in cooperation with the memory 162. The input/output port 164 inputs and outputs electrical signals to and from the monitor 120 or the input device 130 in response to commands from the processor 161. The input/output port 164 may input and output electrical signals to and from other devices such as the robot controller 3. The communication port 165 performs data communication with other devices via a communication network N in accordance with the command from the processor 161.

The monitor 120 is a device for displaying information output from the main body 110. The monitor 120 may be anything as long as the graphic display is realized, and specific examples thereof include a liquid crystal panel.

The input device 130 is a device for inputting information to the main body 110. The input device 130 may be any device that is capable of receiving input information, and examples thereof include an operation interface such as a keypad, a mouse, or a manipulation controller.

The monitor 120 and input device 130 may be integrated as a touch panel. For example, the main body 110, the monitor 120, and the input device 130 may be integrated, such as in a tablet computer.

Robot Control Method

As some examples of the robot control method according to the present disclosure, an example of a series of processing procedures executed by the robot control system 10 will be described with reference to FIG. 3. FIG. 3 is a flowchart showing an example of processing in the robot control system 10 as a processing flow S1. That is, the robot control system 10 executes the processing flow S1.

In step S11, the extraction unit 14 attempt to extract the task area from the observation area. The extraction unit 14 extracts the task area from an observation area that is set to an initial position based on a predetermined preset or an observation area whose position has been changed by the search unit 11. In some examples, the image acquisition unit 13 acquires an image of the observation area from the camera 20, and the extraction unit 14 extracts the task area based on the image. The extraction unit 14 may extract a plurality of task areas in one observation area. In some examples, the extraction unit 14 determines that an observation area has no task area to be extracted.

The extraction unit 14 may extract the task area based on the configuration of the robot 2 and the current situation (or current state) in the observation area. The current situation in the observation area refers to the current situation in the vicinity of the robot 2. As the current situation in the observation area, the extraction unit 14 may determine whether the target object exists in the observation area, may determine the structure of the target object (e.g., the shape of the target object), or may determine whether an obstacle different from the target object exists in the observation area.

The extraction unit 14 extracts the task area corresponding to a task to be performed. In a case where it enables to cause the robot 2 to perform a plurality of types of tasks, the extraction unit 14 extracts a task area corresponding to a task to be performed.

In some examples, the extraction unit 14 analyzes each pixel of the image by a technique such as machine learning using deep learning (for example, convolutional neural network (CNN)), color filtering, or template matching, and calculates, for each pixel, a probability that the target object exists. In some examples, the extraction unit 14 may calculate a probability that the observation area includes a task area in which the robot 2 is to perform a task on a target object, based on the image. The extraction unit 14 then generates a gray scale image indicating the probability at each pixel. It may be said that the gray scale image is information stochastically indicating the position of the target object in the observation area. The extraction unit 14 may extract an area in which the target object appears as the task area based on the gray scale image.

Alternatively, the extraction unit 14 may acquire a depth image separately from the grayscale image, and extract the task area based on the two types of images. The extraction unit 14 may use the depth image generated by the camera 20, or may generate the depth image based on the image from the camera 20 and the depth information. Based on the grayscale image and the depth image, the extraction unit 14 identifies a depth at a position where the target object is expected to exist. Based on the depth, and the configuration of the end effector 2b (e.g., the shape of the end effector 2b), the extraction unit 14 calculates whether the robot 2 is able to process the target object at that position. As described above, the extraction unit 14 may extract the task area by comparing the configuration of the end effector 2b with the structure of the target object (e.g., by comparing the shape of the end effector 2b with the shape of the target object). In some examples, the extraction unit 14 uses the Gaussian function in the calculation to stochastically calculate whether the robot 2 is able to process the target object. In a case where the task includes a step of grasp the target object, the extraction unit 14 may execute the calculation using the Fast Graspability Evaluation (FGE), which is a technique for identifying positions at which the target object may be grasped. The extraction unit 14 calculates, by such probabilistic calculation, the distribution of the probability that the task area exists, with respect to the observation area. In the present disclosure, the distribution is also referred to as an area map. In some examples, the extraction unit 14 extracts an area whose probability reaches a predetermined threshold, as the task area. That is, the extraction unit 14 may extract the task area in response to determining that the probability reaches a predetermined threshold.

As in the above examples, the extraction unit 14 may extract the task area based at least on the target object existing in the observation area. The extraction unit 14 may extract the task area further based on an interference being not detected between the robot 2 with the obstacle when the robot 2 performs the task. That is, the extraction unit 14 may extract the task area based on a determination that the obstacle does not present an interference for the robot 2 to perform the task on the target object. The use of the FGE is an example of extracting the task area in consideration of the interference.

FIG. 4 is a diagram illustrating an example extraction of the task area. In this example, the robot 2 performs a task of grasping an orange and moving the orange to a predetermined place. In order to realize this autonomous processing, the extraction unit 14 analyzes an image 200 obtained from the camera 20 and extracts a task area in which the robot 2 is expected to be able to grasp the orange. That is, the extraction unit 14 extracts, as the task area, an area in which the robot 2 is able to contact the target object (orange) to execute the task.

The image 200 indicates an orange 221 placed on a floor 211 and an orange 222 held on a fence 212. Around the orange 221 are some other objects 231 that may be obstacles while the task is performed. The image 200 also indicates the tip of a gripper that is an example of the end effector 2b.

The extraction unit 14 analyzes the image 200 to extract a task area 311 corresponding to the orange 221 and a task area 312 corresponding to the orange 222. An area map 300 indicates the distribution of the probability that task area exists. In the area map 300, regions with high probability are represented relatively lighter and regions with a low probability are represented relatively darker. The task area 311 is represented in dark grey, whereas the task area 312 is represented in white. This indicates that the possibility of gripping the orange 222 is higher than the possibility of gripping the orange 221. Such a difference are expected to be due to at least one of the fact that the other objects 231 exists near the orange 221 and the fact that the orange 221 is farther than the orange 222.

Referring back to FIG. 3, in a case where at least one task area has been extracted (YES in step S12), the process proceeds to step S13.

In step S13, the robot control unit 15 determines an approach target position that is a position to which the robot 2 should approach further. This process may also be said to be determining where in the observation area to search in more detail. In some examples, the robot control unit 15 may calculate a score indicating a possibility that the robot 2 is able to perform the task, with respect to the observation area, and determine a position having the highest score as the approach target position. The robot control unit 15 may use the area map as a distribution of the scores. Alternatively, the robot control unit 15 may calculate a position of the center of the detected target object as the approach target position.

In a case where a plurality of task areas has been extracted, the robot control unit 15 selects one task area from the plurality of task areas and determines the approach target position for the selected task area. For example, the robot control unit 15 may select the task area corresponding to the highest score. In some examples, the robot control system 10 extracts from the image a plurality of task areas, associated with a plurality of probabilities, and identifies a selected task area from the plurality of task areas, based on a comparison of the plurality of probabilities. The task area that the robot 2 approaches may correspond to the selected task area.

In step S14, the robot control unit 15 determines whether the robot 2 has reached the task area.

In some examples, the robot control unit 15 may calculate a distance between the end effector 2b and the approach target position and execute the determination based on the distance. In a case where the calculated distances are less than or equal to a predetermined threshold, the robot control unit 15 determines that the robot 2 has reached the task area. On the other hand, in a case where the calculated distance is greater than the threshold, the robot control unit 15 determines that the robot 2 has not reached the task area.

In other examples, the robot control unit 15 may calculate a target configuration indicating the state of the robot 2 needed to perform the task in the task area and an uncertainty thereof. The target configuration includes, for example, the position and posture of the robot 2 to start the task. Details of the target configuration will be described later. In a case where the calculated uncertainty is less than or equal to a predetermined threshold, the robot control unit 15 determines that the robot 2 has reached the task area. On the other hand, in a case where the calculated uncertainty is greater than the threshold, the robot control unit 15 determines that the robot 2 has not reached the task area.

In a case of determining that the robot 2 has not reached the task area (NO in step S14), the process proceeds to step S15. In step S15, the robot control unit 15 controls the robot toward the task area. That is, the robot control unit 15 controls the robot 2 such that the robot 2 approaches the target object. In some examples, the robot control unit 15 controls the robot 2 to further approach the task area, to iteratively move the robot 2 toward the task area. In a case where one task area is selected from the plurality of task areas, the robot control unit 15 controls the robot 2 such that the robot 2 approaches the selected task area (the target object).

In some examples, the robot control unit 15 generates, by planning, a path of the robot 2 to move the end effector 2b from the current position to the approach target position. Alternatively, the robot control unit 15 may generate a path (trajectory) of the robot 2 by the planning such that the approach target position appears at the center of the image of the camera 20 while reducing the distance. The robot control unit 15 may select an appropriate position and posture from preset candidates of position and posture of the robot 2, and may generate a path for realizing the selected position and posture, by the planning. As at least part of the planning of the path, the robot control unit 15 may execute at least one of the generation of a path in which an interference between the robot 2 and the obstacle is not detected and the generation of a path in which a singular posture (singular point) of the robot 2 is not detected. The singular posture (singular point) refers to a posture in which the control of the robot 2 cannot be performed due to the structure of the robot 2.

The robot control unit 15 outputs a command signal indicating the generated path to the robot controller 3, and the robot controller 3 controls the robot 2 in accordance with the command signal. As a result, the robot 2 approaches the target object along the path.

After step S15, the process returns to step S11, and the robot control system 10 executes the processing from step S11 again. That is, the robot control system 10 extracts the task area again after the robot 2 approaches the target object, and executes the subsequent processing based on the extraction result. That is, the robot control system 10 acquires a first image of an observation area in a vicinity of a robot, from an image sensor, calculates a probability that the observation area includes a task area in which the robot is to perform a task on a target object, based on the first image, extracts the task area from the first image, based on the probability calculated, and controls the robot to cause the robot to approach the task area. Then the robot control system 10 acquires a second image of the observation area from the image sensor, after the robot approaches the task area, calculates a probability that the observation area includes the task area, based on the second image, extracts the task area from the second image based on the probability associated with the second image, and controls the robot to further approach the task area extracted from the second image, to iteratively move the robot toward the task area.

In a case of determining that the robot 2 has reached the task area (YES in step S14), the process proceeds to step S16. In step S16, the robot control unit 15 causes the robot 2 to perform the task.

In some examples, the robot control unit 15 calculates the target configuration and generates a path by the planning based on the target configuration. As described above, the target configuration may include the position and posture of the robot 2 to start the task. For example, in a case where the robot 2 is caused to grip the target object, the robot control unit 15 calculates the position and posture of the robot 2 including the opening width of the gripper for the gripping. In a case where the task includes multiple main actions (e.g., a task that includes grasping a target object in a first position and placing the target object in a second position), the robot control unit 15 may calculate the target configuration for each main action. Subsequently, the robot control unit 15 generates a path for executing the target configuration and the task, by the planning. Also in such a planning, the robot control unit 15 may execute at least one of the generation of a path in which an interference between the robot 2 and the obstacle is not detected and the generation of a path in which a singular posture (singular point) of the robot 2 is not detected.

The robot control unit 15 outputs a command signal indicating the generated path to the robot controller 3, and the robot controller 3 controls the robot 2 in accordance with the command signal. The robot control unit 15 may output a command signal indicating a path for preforming the target configuration to the robot controller 3 and then output a command signal indicating a path for performing the task to the robot controller 3. In any way, the robot 2 moves toward the position and posture based on the target configuration and then performs the task.

In step S17, the robot control unit 15 determines whether to terminate the robot control. The robot control unit 15 may make the determination based on any termination condition. For example, the robot control unit 15 may determine to terminate the robot control in a case where the task is executed a prescribed number of times, and may determine to continue the robot control in a case where the number of times the task is executed is less than the prescribed number of times. Alternatively, the robot control unit 15 may determine to terminate the robot control in a case where an error is detected in the robot control, and may determine to continue the robot control when the error is not detected.

In a case of determining to terminate the robot control (YES in step S17), the process proceeds to step S18. In step S18, the robot control system 10 executes termination processing. In the termination processing, the robot control unit 15 may return the robot 2 to the initial posture and position. Alternatively, the robot control unit 15 may notify the user by visual information or audio that all tasks have been completed.

In a case of continuing the robot control (NO in step S17), the process proceeds to step S19. In step S19, the robot control unit 15 executes preparation for the next task. For example, the robot control unit 15 may return the robot 2 to the initial posture and position. Alternatively, the robot control unit 15 may notify the user by visual information or audio that the next task is to be performed.

After step S19, the process returns to step S11, and the robot control system 10 executes the processing from step S11 for the next task.

The above-described series of processing procedures mainly relate to the exploitation among the exploration and exploitation. Next, a processing procedure mainly related to the exploration will be described.

In a case where the task area is not extracted (NO in step S12), the process proceeds to step S20. In step S20, the search unit 11 records observation data indicating at least one observation area observed so far. For example, the search unit 11 records the observation data indicating a plurality of observation areas observed while bringing the robot 2 close to the target object. In some examples, the search unit 11 generates a record of the observation data for each observation area. The record may include, as data items, representative coordinates of the observation area, an observation time, and a score indicating an execution possibility of the task at the representative coordinates. Each record may further include at least one of an area map, an extracted task area, a number of processed target objects, and an execution history of a task. The search unit 11 stores at least one record in the observation history database 12.

In step S21, the search unit 11 determines whether to continue searching for the target object. In some examples, the search unit 11 determines whether it is likely to find a new target object based on the observation data in the observation history database 12. In a case of determining that there is such a possibility, the search unit 11 determines to continue the search, and in a case of determining that there is no such possibility, the search unit 11 determines to terminate the search. For example, the search unit 11 processes the observation data by the Gaussian process regression to calculate a predicted value and uncertainty for the potential for action in the three-dimensional space in the vicinity of the robot 2. The search unit 11 determines to continue the search in a case where there is a position whose uncertainty is greater than a predetermined threshold, and determines to terminate the search in a case where there is no such position. It is worth trying to search for such a position because the uncertainty greater than the threshold indicates that it is unable to be confident in determining whether the task area will be extracted.

Alternatively, the search unit 11 may determine to continue the search in a case where a position whose distance to the closest representative coordinates indicated by the observation data is longer than a predetermined threshold exists in an image plane corresponding to the three-dimensional space in the vicinity of the robot, and may determine to terminate the search in a case where such a position is not detected.

Alternatively, the search unit 11 may determine to continue the search in a case where an unobserved area exists within a preset observation range, and may determine to terminate the search in a case where the unobserved area does not exist. The observation range is, for example, all or part of the three-dimensional space in the vicinity of the robot 2. It may be said that this method is a technique of searching the whole of the observation range without omission.

In a case of determining to continue the search (YES in step S21), the process proceeds to step S22. In step S22, the search unit 11 changes the position of the observation area in the three-dimensional space in the vicinity of the robot 2. Step S22 may be executed in a case where the task area is not extracted from the observation area (NO in step S12). That is, the search unit 11 changes the position of the observation area in response to the extraction unit 14 not extracting the task area.

In some examples, the search unit 11 dynamically changes the position of the observation area. This dynamic change refers to the fact that a next position of the observation area is not predetermined and the search unit 11 determines the next position of the observation area in response to the current situation in the vicinity of the robot 2. The search unit 11 may dynamically change the next position of the observation area based on the observation data in the observation history database 12. For example, the search unit 11 may calculate a score indicating a possibility that the task area is extracted in the three-dimensional space in the vicinity of the robot 2, based on a result of extraction of the task area in the observation area at at least one past position, and change the position of the observation area based on the score. For example, search unit 11 may acquire extraction result history associated with one or more task area extractions attempted in previous observation areas, and calculate the score (which may indicate a possibility that the three-dimensional space includes a next task area to be extracted) based on the extraction result history, so that a next observation area may be selected based on the score. The search unit 11 may move the observation area to the position with the highest score. Alternatively, the search unit

11 may calculate a distribution of uncertainty of the presence of the task area in the three-dimensional space, based on the observation data, and change the position of the observation area based on the distribution. For example, the search unit 11 may calculate a distribution of uncertainty that the three-dimensional space includes the next task area to be extracted, based on the extraction result history, and change the position of the observation area based on the distribution of uncertainty. The search unit 11 may move the observation area to the position with the highest uncertainty. As a method of considering both the score and uncertainty, the search unit 11 may execute the Bayesian optimization using the observation data as an input, and change the position of the observation area based on an acquisition function obtained by the Bayesian optimization. For example, the search unit 11 moves the observation area to a position where the value of the acquisition function is the highest.

Alternatively, the search unit 11 may select a position where a shortest distance to the representative coordinates indicated by the observation data is the longest, from the image plane corresponding to the three-dimensional space in the vicinity of the robot 2, and move the observation area to the position. This process is also an example of dynamically changing the position of the observation area.

Alternatively, the search unit 11 may change the position of the observation area in accordance with a predetermined order, or may randomly determine the next position of the observation area.

In response to the search unit 11 determining the next position of the observation area, the robot control unit 15 generates a path of the robot 2 by planning such that the camera 20 images the next observation area. For example, the robot control unit 15 may plan the path such that the next position appears in the center of the image of the camera 20. The robot control unit 15 may select an appropriate position and posture from preset candidates of position and posture of the robot 2, and generate a path for realizing the selected position and posture, such that the camera 20 images the next observation area. As at least part of the planning of the path, the robot control unit 15 may execute at least one of the generation of a path in which interference between the robot 2 and the obstacle is not detected and the generation of a path in which a singular posture (singular point) of the robot 2 is not detected.

The robot control unit 15 outputs a command signal indicating the generated path to the robot controller 3, and the robot controller 3 controls the robot 2 in accordance with the command signal. As a result, the camera 20 images the next observation area.

After step S21, the process returns to step S11, and the robot control system 10 executes the processing from step S11. In step S11, the extraction unit 14 extracts the task area from the changed observation area. That is, the extraction unit 14 extracts the task area each time the position of the observation area is changed.

In a case of determining to terminate the search (NO in step S21), the process proceeds to step S18, and the robot control system 10 executes the termination process.

Figure 5:
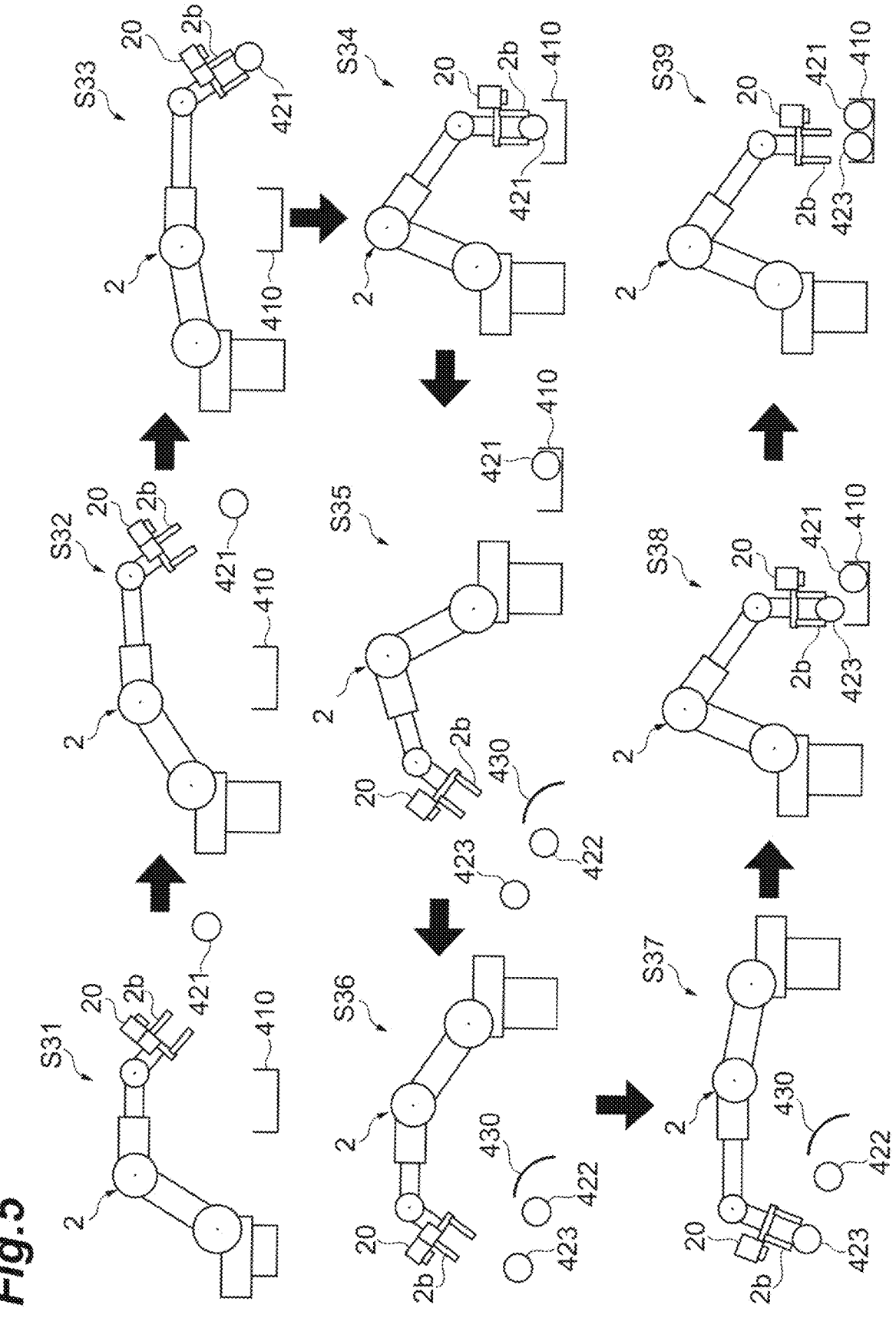
FIG. 5 is a diagram showing an example robot control by the robot control system.

An example operation of the robot based on the processing flow S1 will be described with reference to FIG. 5. FIG. 5 is a diagram showing an example robot control by the robot control system 10. In this example, the robot 2 performs a task of storing balls existing in the vicinity of the robot 2 into a box 410. That is, in this example, the target objects are balls. FIG. 5 shows a series of motions of the robot 2 in order of scenes S31 to S39. In the following explanations, the correspondence with the processing flow S1 is also described.

In scene S31, the camera 20 acquires an image indicating a ball 421, and the image acquisition unit 13 acquires the image. The robot control system 10 extracts a task area corresponding to the ball 421 from the image (observation area) (step S11).

In scene S32, the robot control system 10 controls the robot 2 such that the robot 2 approaches the ball 421 (steps S12 to S15). By this control, the distance between the end effector 2b and the ball 421 is shortened. After this process, the robot control system 10 repeats the extraction of the task area and the control (steps S11 to S15) of bringing the robot 2 close to the ball 421.

In scene S33, in response to the robot 2 reaching the task area (YES in step S14), the robot control system 10 causes the robot 2 to perform the task (step S16).

From scenes S33 to S34, the robot 2 performs the task under the control by the robot control system 10 (step S16). The robot 2 grips the ball 421 with the end effector 2b and places the ball 421 into the box 410.

Thereafter, the robot control system 10 attempts to extract the task area while changing the position of the observation area (steps S11, S12, and S20 to S22). As a result of this search, in scene S35, the camera 20 acquires an image capturing two balls 422, 423, and the image acquisition unit 13 acquires the image. In this image, the ball 422 is shown as if it is blocked by an obstacle 430, and the entire ball 423 is shown. In some examples, the robot control system 10 extracts a task area corresponding to the ball 423 from the image (observation area)(step S11), but does not extract the portion corresponding to the ball 422 as the task area.

In scene S36, the robot control system 10 controls the robot 2 such that the robot 2 approaches the ball 423 (steps S12 to S15). By this control, the distance between the end effector 2b and the ball 423 is shortened. After this process, the robot control system 10 repeats the extraction of the task area and the control (steps S11 to S15) of bringing the robot 2 close to the ball 423.

In scene S37, in response to the robot 2 reaching the task area (YES at step S14), the robot control system 10 causes the robot 2 to perform the task (step S16).

From scenes S37 to S39, the robot 2 performs the task under the control by the robot control system 10 (step S16). The robot 2 grips the ball 423 with the end effector 2b (scene S37), carries the ball 423 to the box 410 (scene S38), and puts the ball 423 into the box 410 (scene S39).

Program

Each functional module of the robot control system 10 is implemented by reading a robot control program on the processor 161 or the memory 162 and causing the processor 161 to execute the program. The robot control program includes codes for implementing each functional module of the robot control system 10. The processor 161 operates the input/output port 164 or the communication port 165 in accordance with the robot control program and reads and writes data in the memory 162 or the storage 163. By such processing, each functional module of the robot control system 10 is realized.

The robot control program may be provided after being fixedly recorded in a non-transitory storage medium such as a CD-ROM, a DVD-ROM, or a semiconductor memory. Alternatively, the robot control program may be provided through a communication network, as a data signal superimposed on a carrier wave.

As described above, a robot control system according to an aspect of the present disclosure includes: acquire a first image of an observation area in a vicinity of a robot, from an image sensor; calculate a probability that the observation area includes a task area in which the robot is to perform a task on a target object, based on the first image; extract the task area from the first image, based on the probability calculated; control the robot to cause the robot to approach the task area; acquire a second image of the observation area from the image sensor, after the robot approaches the task area; calculate a probability that the observation area includes the task area, based on the second image; extract the task area from the second image based on the probability associated with the second image; and control the robot to further approach the task area extracted from the second image, to iteratively move the robot toward the task area.

A processor-executable method according to an aspect of the present disclosure includes: acquiring a first image of an observation area in a vicinity of a robot, from an image sensor, calculating a probability that the observation area includes a task area in which the robot is to perform a task on a target object, based on the first image; extracting the task area from the first image, based on the probability calculated; controlling the robot to cause the robot to approach the task area; acquiring a second image of the observation area from the image sensor, after the robot approaches the task area; calculating a probability that the observation area includes the task area, based on the second image; extracting the task area from the second image based on the probability associated with the second image; and controlling the robot to further approach the task area extracted from the second image, to iteratively move the robot toward the task area.

A non-transitory computer-readable storage medium according to an aspect of the present disclosure stores processor-executable instructions to: acquire a first image of an observation area in a vicinity of a robot, from an image sensor, calculate a probability that the observation area includes a task area in which the robot is to perform a task on a target object, based on the first image; extract the task area from the first image, based on the probability calculated; control the robot to cause the robot to approach the task area; acquire a second image of the observation area from the image sensor, after the robot approaches the task area; calculate a probability that the observation area includes the task area, based on the second image; extract the task area from the second image based on the probability associated with the second image; and control the robot to further approach the task area extracted from the second image, to iteratively move the robot toward the task area.

In such examples, since the task area is extracted each time the robot approaches the target object or target area, the robot may be controlled while adapting to a change in the situation in the vicinity of the robot. By such control, the robot may efficiently execute the task.

In some examples, the circuitry may be further configured to cause the robot to perform the task, in response to detecting that the robot has reached the task area. With this configuration, the robot may perform the task at the timing of reaching a position where the target object is able to be processed. Therefore, it enables to cause the robot to efficiently execute the task.

In some examples, the image sensor may be movable according to a movement of the robot. By using an image from such an image sensor, the situation in the vicinity of the robot may be recognized clearly and reliably. As a result, the task area may be accurately extracted.

In some examples, the circuitry may be configured to: extract from the first image a plurality of task areas including the task area, associated with a plurality of probabilities; and identify a selected task area from the plurality of task areas, based on a comparison of the plurality of probabilities, and the task area that the robot approaches may correspond to the selected task area. With this configuration, even in a case where a plurality of task areas are extracted, the robot may be appropriately brought close to a specific task area.

In some examples, the circuitry may be configured to, for each of a plurality of tasks different from each other, extract the task area corresponding to the task, from the first image. With this configuration, the robot may be efficiently controlled in accordance with each type of task.

In some examples, the task area may be further extracted based on a configuration of the robot and a current state of the observation area. By taking these two factors into consideration, task area may be extracted with high accuracy.

In some examples, the current state may include whether the observation area includes the target object, and the task area may be extracted further based on a determination that the observation area includes the target object. By causing the robot to approach the target object only after recognizing the existence of the target object, the robot may be caused to perform the task while suppressing an unnecessary motion of the robot.

In some examples, the current state may further include whether the observation area includes an obstacle different from the target object, and the task area may be extracted further based on a determination that the obstacle does not present an interference for the robot to perform the task on the target object. By bringing the robot close in consideration of the existence of the obstacle, the robot may be caused to perform the task while suppressing a useless motion of the robot.

In some examples, the configuration of the robot may include a shape of an end effector of the robot, the current state may further include a shape of the target object, and the task area may be extracted further based on a comparison of the shape of the end effector with the shape of the target object. By bringing the robot close to the target object in consideration of the structure of the target object and the configuration of the end effector that handles the target object, the robot may be caused to perform the task while suppressing an unnecessary motion of the robot.

In some examples, the task area may be extracted from the first image in response to determining that the probability associated with the first image reaches a predetermined threshold. By stochastically extracting the task area, the robot may be controlled while flexibly adapting to the surrounding situation of the robot.

In some examples, the circuitry may be configured to calculate a distribution of probabilities in the observation area from the first image, and the task area may be extracted from the first image by selecting a region of the first image in which the probability reaches the threshold, based on the distribution. The task area may be accurately and efficiently extracted from the observation area by considering the distribution of the probability.

In some examples, the observation area may be a first observation area in a three-dimensional space in the vicinity of the robot, and the circuitry may be further configured to: acquire a third image of a second observation area in the three-dimensional space; attempt an extraction of a next task area from the third image; determine that the second observation area includes no task area; and select a third observation area in the three-dimensional space to acquire a fourth image, in response to determining that the second observation area includes no task area. By changing the position of the observation area in a case where the task area is not extracted, the robot may be caused to execute the task while suppressing an unnecessary motion of the robot.

In some examples, the third observation area may be selected dynamically in the three-dimensional space, based on a current state of the observation area. With this configuration, the observation area may be set appropriately according to the situation in the vicinity of the robot.

In some examples, the circuitry may be configured to: acquire extraction result history associated with one or more task area extractions attempted in previous observation areas; and calculate a score that indicates a possibility that the three-dimensional space includes the next task area to be extracted, based on the extraction result history, and the third observation area is selected based on the score. By setting the observation area based on the degree of the possibility that the task area is extracted based on the past result, the task area may be efficiently extracted.

In some examples, the circuitry may be configured to calculate a distribution of uncertainty that the three-dimensional space includes the next task area to be extracted, and the third observation area may be selected based on the distribution of uncertainty. The observation area may be efficiently set in consideration of the uncertainty, and as a result, the task area may be efficiently extracted.

In some examples, the circuitry may be configured to: control the image sensor to acquire images associated with a plurality of observation areas including the first observation area, the second observation area and the third observation area; and attempt an extraction of at least one task area at each of the plurality of observation areas. By extracting the task area while changing the observation area, the robot may efficiently execute the task.

In some examples, the task may include a process in which the robot is to contact the target object, and the task area may include a region in the vicinity of the robot, in which the robot is operable to contact the target object to perform the task. With this configuration, the robot may be caused to efficiently perform the task involving the contact with the target object.

In some examples, the probability associated with the first image may correspond to a probability that the task area includes the target object, and the probability may be calculated based on pixels of the first image.

A robot system according to an aspect of the present disclosure includes the above-described robot control system and a robot that operates under a control by the robot control system. In this aspect, the robot may be caused to efficiently perform the task.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail.

The functional configuration of the robot control system is not limited to the examples described above. The robot control method according to the present disclosure may be executed using a functional configuration different from the above-described examples.

The hardware configuration of the system is not limited to an example in which each functional module is implemented by executing a program. For example, at least part of the functional modules in the above-described examples may be configured by logic circuitry specialized for the functions, or may be configured by an application specific integrated circuit (ASIC) in which the logic circuitry is integrated.

The processing procedure of the method executed by at least one processor is not limited to the above examples. For example, some of the above-described steps (processes) may be omitted, or the steps may be executed in a different order. Further, any two or more steps among the above-described steps may be combined, or part of the steps may be modified or deleted. Alternatively, other steps may be executed in addition to the above-described steps. In the processing flow S1 described above, each step may be performed in series, or several steps may be performed in parallel.

In a case where the magnitude relationship between two numerical values is compared in a computer system or a computer, either of two criteria of "equal to or greater than" and "greater than" may be used, and either of two criteria of "equal to or less than" and "less than" may be used.

Regarding the above examples, the following appendices are provided by way of further illustration.

(Appendix 1) A robot control system comprising:
an extraction unit configured to extract a task area in which a robot is operable to perform a task for processing a target object, from an observation area in the vicinity of the robot;
a robot control unit configured to control the robot such that the robot approaches the target object, in response to the task area being extracted,
wherein the extraction unit is configured to extract the task area again after the robot approaches the target object.

(Appendix 2) The robot control system according to Appendix 1, wherein the robot control unit is configured to cause the robot to perform the task, in response to the robot reaching the task area.

(Appendix 3) The robot control system according to Appendix 1 or 2, further comprising an image acquisition unit configured to acquire an image of the observation area from a camera that moves corresponding to a motion of the robot,
wherein the extraction unit is configured to extract the task area based on the image.

(Appendix 4) The robot control system according to any one of Appendices 1 to 3,
wherein the extraction unit is configured to extract a plurality of the task areas, and
wherein the robot control unit is configured to:
select one task area from the plurality of task areas; and
control the robot such that the robot approaches the selected task area.

(Appendix 5) The robot control system according to any one of Appendices 1 to 4, wherein the robot control system is configured to extract, for each of a plurality of tasks different from each other, the task area corresponding to the task.

(Appendix 6) The robot control system according to nay one of Appendices 1 to 5, wherein the extraction unit is configured to extract the task area based on a configuration of the robot and a current situation in the observation area.

(Appendix 7) The robot control system according to Appendix 6,
wherein the current situation indicates whether the target object exists in the observation area, and the extraction unit is configured to extract the task area based at least on the target object existing in the observation area.

(Appendix 8) The robot control system according to Appendix 7,
wherein the current situation further indicates whether an obstacle different from the target object exists in the observation area, and
the extraction unit is configured to extract the task area further based on the robot not interfering with the obstacle when the robot performs the task.

(Appendix 9) The robot control system according to Appendix 7 or 8,
wherein the configuration of the robot includes a configuration of an end effector attached to the robot,
wherein the current situation further indicates a structure of the target object, and
wherein extraction unit is configured to compare the configuration of the end effector with the structure of the target object to extract the task area.

(Appendix 10) The robot control system according to any one of Appendices 1 to 9, wherein the extraction unit is configured to:
calculate a probability that the task area exists; and
extract the task area in response to the probability reaching a predetermined threshold.

(Appendix 11) The robot control system according to Appendix 10, wherein the extraction unit is configured to:
calculate a distribution of the probability in the observation area; and
extract a region in which the probability reaches the threshold as the task area.

(Appendix 12) The robot control system according to any one of Appendices 1 to 11, further comprising a search unit configured to change a position of the observation area in a three-dimensional space in the vicinity of the robot in response to the extraction unit not extracting the task area.

(Appendix 13) The robot control system according to Appendix 12, wherein the search unit is configured to dynamically change the position of the observation area in the three-dimensional space.

(Appendix 14) The robot control system according to Appendix 12 or 13, the search unit is configured to:
calculate a score indicating a possibility that the task area is extracted in the three-dimensional space, based on a result of extraction of the task area in the observation area in at least one past position; and
change the position of the observation area based on the score.

(Appendix 15) The robot control system according to Appendix 14, the search unit is configured to:
calculate a distribution of uncertainty of existence of the task area in the three-dimensional space; and
change the position of the observation area based on the distribution of uncertainty.

(Appendix 16) The robot control system according to any one of Appendices 12 to 15, wherein the extraction unit is configured to extract the task area each time the position of the observation area is changed.

(Appendix 17) The robot control system according to any one of Appendices 1 to 16,
wherein the task includes a step in which the robot contacts the target object, and
wherein the extraction unit is configured to extract, as the task area, an area in which the robot is operable to contact the target object to perform the task.

(Appendix 18) A robot system comprising:

a robot control system according to any one of Appendices 1 to 17;

a robot configured to operate under a control by the robot control unit;

(Appendix 19) A robot control method executed by a robot control system including at least one processor, the method comprising:

extracting a task area in which a robot is operable to perform a task for processing a target object, from an observation area in the vicinity of the robot;

controlling the robot such that the robot approaches the target object, in response to the task area being extracted, wherein the extracting includes extracting the task area again after the robot approaches the target object.

(Appendix 20) A robot control program causing a computer to execute:

extracting a task area in which a robot is operable to perform a task for processing a target object, from an observation area in the vicinity of the robot;

controlling the robot such that the robot approaches the target object, in response to the task area being extracted, wherein the extracting includes extracting the task area again after the robot approaches the target object.

What is claimed is:

1. A robot control system comprising circuitry configured to:

acquire a first image of an observation area in a vicinity of a robot, from an image sensor;

calculate a probability that the observation area includes a task area in which the robot is to perform a task on a target object, based on the first image, wherein the circuitry is configured to compare a configuration of an end effector of the robot with a structure of the target object included in the observation area based on the first image to calculate the probability;

extract the task area from the first image, based on the probability calculated;

control the robot to cause the robot to approach the task area;

acquire a second image of the observation area from the image sensor, after the robot approaches the task area;

calculate the probability that the observation area includes the task area, based on the second image, wherein the circuitry is configured to compare the configuration of the end effector with the structure of the target object included in the observation area based on the second image to calculate the probability;

extract the task area from the second image based on the probability associated with the second image; and control the robot to further approach the task area extracted from the second image, to iteratively move the robot toward the task area.

2. The robot control system according to claim 1, wherein the circuitry is further configured to cause the robot to perform the task, in response to detecting that the robot has reached the task area.

3. The robot control system according to claim 1, wherein the image sensor is movable in response to a movement of the robot.

4. The robot control system according to claim 1, wherein the circuitry is configured to:

extract from the first image a plurality of task areas including the task area, associated with a plurality of probabilities; and identify a selected task area from the plurality of task areas, based on a comparison of the plurality of probabilities, wherein the task area that the robot approaches corresponds to the selected task area.

5. The robot control system according to claim 1, wherein the circuitry is configured to, for each of a plurality of tasks different from each other, extract the task area corresponding to the task, from the first image.

6. The robot control system according to claim 1, wherein the task area is further extracted based on a configuration of the robot and a current state of the observation area.

7. The robot control system according to claim 6, wherein the current state includes whether the observation area includes the target object, and wherein the task area is extracted further based on a determination that the observation area includes the target object.

8. The robot control system according to claim 7, wherein the current state further includes whether the observation area includes an obstacle different from the target object, and wherein the task area is extracted further based on a determination that the obstacle does not present an interference for the robot to perform the task on the target object.

9. The robot control system according to claim 7, wherein the configuration of the robot includes a shape of an end effector of the robot, wherein the current state further includes a shape of the target object, and wherein the task area is extracted further based on a comparison of the shape of the end effector with the shape of the target object.

10. The robot control system according to claim 1, wherein the task area is extracted from the first image in response to determining that the probability associated with the first image reaches a predetermined threshold.

11. The robot control system according to claim 10, wherein the circuitry is configured to calculate a distribution of probabilities in the observation area from the first image, and wherein the task area is extracted from the first image by selecting a region of the first image in which the probability reaches the threshold, based on the distribution.

12. The robot control system according to claim 1, wherein the observation area is a first observation area in a three-dimensional space in the vicinity of the robot, and wherein the circuitry is further configured to:

acquire a third image of a second observation area in the three-dimensional space;

attempt an extraction of a next task area from the third image;

determine that the second observation area includes no task area; and select a third observation area in the three-dimensional space to acquire a fourth image, in response to determining that the second observation area includes no task area.

13. The robot control system of claim 12, wherein the third observation area is selected dynamically in the three-dimensional space, based on a current state of the observation area.

14. The robot control system according to claim 12, wherein the circuitry is configured to:

acquire extraction result history associated with one or more task area extractions attempted in previous observation areas; and calculate a score that indicates a possibility that the three-dimensional space includes the next task area to be extracted, based on the extraction result history, and wherein the third observation area is selected based on the score.

15. The robot control system according to claim 12, wherein the circuitry is configured to calculate a distribution of uncertainty that the three-dimensional space includes the next task area to be extracted, and wherein the third observation area is selected based on the distribution of uncertainty.

16. The robot control system according to claim 12, wherein the circuitry is configured to:

control the image sensor to acquire images associated with a plurality of observation areas including the first observation area, the second observation area and the third observation area; and attempt an extraction of at least one task area at each of the plurality of observation areas.

17. The robot control system according to claim 1, wherein the task includes a process in which the robot is to contact the target object, and wherein the task area includes a region in the vicinity of the robot, in which the robot is operable to contact the target object to perform the task.

18. The robot control system according to claim 1, wherein the probability associated with the first image corresponds to a probability that the task area includes the target object, and wherein the probability is calculated based on pixels of the first image.

19. A processor-executable method comprising:

acquiring a first image of an observation area in a vicinity of a robot, from an image sensor;

calculating a probability that the observation area includes a task area in which the robot is to perform a task on a target object, based on the first image, wherein the calculating comprises comparing a configuration of an end effector of the robot with a structure of the target object included in the observation area based on the first image to calculate the probability;

extracting the task area from the first image, based on the probability calculated;

controlling the robot to cause the robot to approach the task area;

acquiring a second image of the observation area from the image sensor, after the robot approaches the task area;

calculating the probability that the observation area includes the task area, based on the second image, wherein the calculating comprises comparing the configuration of the end effector with the structure of the target object included in the observation area based on the second image to calculate the probability;

extracting the task area from the second image based on the probability associated with the second image; and controlling the robot to further approach the task area extracted from the second image, to iteratively move the robot toward the task area.

20. A non-transitory computer-readable storage medium storing processor-executable instructions to:

acquire a first image of an observation area in a vicinity of a robot, from an image sensor;

calculate a probability that the observation area includes a task area in which the robot is to perform a task on a target object, based on the first image, wherein a configuration of an end effector of the robot is compared with a structure of the target object included in the observation area based on the first image to calculate the probability;

extract the task area from the first image, based on the probability calculated;

control the robot to cause the robot to approach the task area;

acquire a second image of the observation area from the image sensor, after the robot approaches the task area;

calculate the probability that the observation area includes the task area, based on the second image, wherein the configuration of the end effector is compared with the structure of the target object included in the observation area based on the second image to calculate the probability;

extract the task area from the second image based on the probability associated with the second image; and control the robot to further approach the task area extracted from the second image, to iteratively move the robot toward the task area.

* * * * *